US008554598B2

(12) United States Patent
Pool et al.

(10) Patent No.: US 8,554,598 B2
(45) Date of Patent: Oct. 8, 2013

(54) UNIVERSAL SHOPPING CENTER FOR INTERNATIONAL OPERATION

(75) Inventors: Ed Pool, Shefford (CA); Doug Mauer, Hiwassee, VA (US)

(73) Assignee: Forrest, LLC.

( * ) Notice: Subject to any disclaimer, the term of this patent is extended or adjusted under 35 U.S.C. 154(b) by 0 days.

(21) Appl. No.: 13/343,825

(22) Filed: Jan. 5, 2012

(65) Prior Publication Data

US 2012/0130852 A1 May 24, 2012

Related U.S. Application Data (63) Continuation of application No. 12/322,043, filed on Jan. 28, 2009, now abandoned, which is a continuation of application No. 10/919,763, filed on Aug. 17, 2004, now abandoned, which is a continuation of application No. 09/606,931, filed on Jun. 29, 2000, now Pat. No. 6,845,364, which is a continuation of application No. 08/999,297, filed on Dec. 29, 1997, now Pat. No. 6,460,020.

(60) Provisional application No. 60/033,984, filed on Dec. 30, 1996.

(51) Int. Cl.
*G06Q 30/00* (2012.01)
(52) U.S. Cl.
USPC .......................................... 705/7.21; 705/26.1
(58) Field of Classification Search
USPC ................................................ 705/26.1, 7.21
See application file for complete search history.

(56) References Cited

U.S. PATENT DOCUMENTS

| 4,383,306 | A | 5/1983 | Morimoto et al. |
| 4,713,761 | A | 12/1987 | Sharpe et al. |
| 4,766,293 | A | 8/1988 | Boston |
| 4,799,156 | A | 1/1989 | Shavit et al. |
| 4,926,368 | A | 5/1990 | Morita et al. |
| 4,974,028 | A | 11/1990 | Enoguchi et al. |
| 4,992,940 | A | 2/1991 | Dworkin |
| 5,063,506 | A | 11/1991 | Brockwell et al. |
| 5,077,804 | A | 12/1991 | Richard |
| 5,128,862 | A | 7/1992 | Mueller |
| 5,285,383 | A | 2/1994 | Lindsey et al. |

(Continued)

FOREIGN PATENT DOCUMENTS

| WO | WO-9608783 A | 3/1996 |
| WO | WO-9731322 A | 8/1997 |

OTHER PUBLICATIONS

Business and Financial Applications, 1996 Database Buyer's Guide and Client/Server Sourcebook, DBMS, vol. 9, No. 6, Jun. 1996, pp. 10-15.

(Continued)

*Primary Examiner* — Jagdish Patel
(74) *Attorney, Agent, or Firm* — Robert G. Lev (57) ABSTRACT

An international transaction system for operation over the internet/intranet provides a pre-transactional calculation of all charges involved in any international transaction. Upon the option of the customer, the goods can be viewed on catalogue sheets translated to a language of the customer's choice, and the price provided in a currency selected by the customer. The customer also has the option of initiating the order with automatic credit authorization, generation of an electronic title or commercial invoice and arrangements and payment of shipping charges and any taxes and import/export duties.

15 Claims, 2 Drawing Sheets

(56) References Cited

U.S. PATENT DOCUMENTS

| | | | |
|---|---|---|---|
| 5,319,542 A | 6/1994 | King, Jr. et al. | |
| 5,335,169 A | 8/1994 | Chong | |
| 5,351,189 A | 9/1994 | Doi et al. | |
| 5,420,405 A | 5/1995 | Chasek | |
| 5,557,780 A | 9/1996 | Edwards et al. | |
| 5,592,378 A | 1/1997 | Cameron et al. | |
| 5,594,225 A | 1/1997 | Botvin | |
| 5,630,125 A | 5/1997 | Zellweger | |
| 5,631,827 A | 5/1997 | Nicholls et al. | |
| 5,644,115 A | 7/1997 | Knauer | |
| 5,644,721 A | 7/1997 | Chung et al. | |
| 5,666,493 A | 9/1997 | Wojcik et al. | |
| 5,671,279 A | 9/1997 | Elgamal | |
| 5,694,551 A | 12/1997 | Doyle et al. | |
| 5,710,887 A | 1/1998 | Chelliah et al. | |
| 5,715,314 A | 2/1998 | Payne et al. | |
| 5,717,989 A | 2/1998 | Tozzoli et al. | |
| 5,721,832 A * | 2/1998 | Westrope et al. | 705/7.29 |
| 5,758,328 A | 5/1998 | Giovannoli | |
| 5,787,400 A | 7/1998 | Weber | |
| 5,799,283 A | 8/1998 | Francisco et al. | |
| 5,802,293 A | 9/1998 | van der Sijpt | |
| 5,812,668 A | 9/1998 | Weber | |
| 5,842,178 A | 11/1998 | Giovannoli | |
| 5,850,446 A | 12/1998 | Berger et al. | |
| 5,870,473 A | 2/1999 | Boesch et al. | |
| 5,870,717 A | 2/1999 | Wiecha | |
| 5,875,433 A | 2/1999 | Francisco et al. | |
| 5,889,863 A | 3/1999 | Weber | |
| 5,890,130 A | 3/1999 | Cox et al. | |
| 5,892,900 A | 4/1999 | Ginter et al. | |
| 5,893,076 A | 4/1999 | Hafner et al. | |
| 5,895,454 A | 4/1999 | Harrington | |
| 5,897,621 A | 4/1999 | Boesch et al. | |
| 5,897,622 A | 4/1999 | Blinn et al. | |
| 5,910,896 A | 6/1999 | Hahn-Carlson | |
| 5,910,987 A | 6/1999 | Ginter et al. | |
| 5,960,200 A | 9/1999 | Eager et al. | |
| 5,968,110 A | 10/1999 | Westrope et al. | |
| 5,970,475 A | 10/1999 | Barnes et al. | |
| 5,971,273 A | 10/1999 | Vallaire | |
| 5,987,429 A | 11/1999 | Maritzen et al. | |
| 5,991,394 A | 11/1999 | Dezonno et al. | |
| 5,999,914 A | 12/1999 | Blinn et al. | |
| 6,049,811 A | 4/2000 | Petruzzi et al. | |
| 6,058,373 A | 5/2000 | Blinn et al. | |
| 6,141,647 A | 10/2000 | Meijer et al. | |
| 6,185,683 B1 * | 2/2001 | Ginter et al. | 713/176 |
| 6,205,433 B1 | 3/2001 | Boesch et al. | |
| 6,373,950 B1 | 4/2002 | Rowney | |
| 6,594,692 B1 | 7/2003 | Reisman | |

OTHER PUBLICATIONS

Lovelock et al., Developing Global Strategies for Service Businesses, California Management Review, vol. 38, No. 2, Winter 1996, pp. 64-86.
Schell, Ernest, Business 400: Not Just for Catalogs, Mar. 1991, Catalog Age, pp. 147-148.
Cahn, What Benefits will Global EDI Offer?, Jun. 1992, Transmission & Distribution.
Global Electronic Commerce Though Localization and Multilingualism Global Standards Conference. Building the Global Information Society for the 21st Century, Brussels, Belgium, Oct. 1-3, 1997, vol. 20, No. 2-3, pp. 101-109, XP00867692.
Computer Standards and Interfaces, Dec. 15, 1998; Elsevier, Netherlands ISSN: 0920-5489; pp. 104-109.
Ramberg, Jan; Guide to Incoterms, International Commerical TERMS, (1990) 1-152, ICC Publishing (1991).
Del Busto, Charles, UCP 500 & 400 Compared, ICC Publishing (1993) iii-xvi, 1-134, see 99-100.
"A Basic Guide to Exporting", Unz & Co., Inc. 1998 [Retrieved on Apr. 12, 2001] Retrieved from Internet <URL:http://www.unzco.com/basicguidefindex.html>.
Richardson, H, Freight Forwarder Basics, Transportation and Distribution, vol. 37, No. 5; May 1996, pp. 80-84.
NatWest Bank Surges into Cyberspace, Financial Technology Information Bulletin-vol. 13, No. 11, pp. 1-12 (Jul. 1996).
Middleton, T., Global Migration: A Midwest Manufacturer Seeks a Single Worldwide Accounting System to Begin its Conversion to Client-Server Architecture, Corporate Computing, vol. 2, No. 4, Apr. 1993, pp. 112-122.
Cohn, M., What's new with old apps?, Accounting Technology, vol. 11, No. 5, Jun. 1995, pp. 66-81.
Author Unknown, Highwater Benchmark Test of SAP R/3 2.2D, Oracle 7.1; Windows NT 3.5, Compaq Computer Corporation, Jun. 1995.
Author Unknown, SAP R/3 on the Compaq ProLiant Platform, Compaq Computer Corporation, Jul. 1995.
King, Alcoa cans SAP R/3, turns to Oracle, Computerworld, Apr. 26, 1996.
King, Cllient/server vendors steer automakers toward EDI enhancements, Computerworld, Jan. 15, 1996.
Author Unknown, Sum performs seamless migration to high efficiency Sun StorEdge Solution, Dow Corning Corporation, After 2003.
Author Unknown, SAP P/3 3.0 Goes "live" at first Chicago NBD, Computer Sciences Corporation, News Release, Aug. 26, 1996.
King, D&B success drives Oracle pitch to SAP camp, Computerworld, Jan. 23, 1996.
Hoffman, Dow to upgrade to SAP's R/3, Computerworld, Mar. 11, 1996.
Author Unknown, SAP Case Study, SAP Deutchlaud, 2002 (German Language Article).
Author Unknown, Fast Implementation Success Stories, SAP AG, Nov. 1996.
Hasso Plattner, SAP Today, Slide Set, Vorlesung WS 97/98, 1997.
King, IBM teams with SAP to target smaller companies, Computerworld, Jun. 12, 1996.
Author Unknown, Implementation success stories—national market, SAP AG, Nov. 1996.
Teresko, Leveraging the ERP Backbone, Industryweek, Feb. 3, 1998.
Kay, Going global with ERP, IT Service Management Forum, Jul. 1, 1998.
Perez, Microsoft adds VeriFone software to electronic commerce app, Computerworld, Aug. 5, 1996.
Openvision launches axxion for SAP R/3, Veritas, Press Release, 1997.
King, SAP, AG finds friend in Microsoft, Computerworld, Sep. 11, 1995.
Weston, SAP AG makes business APIs available on Web site, Computerworld, Nov. 6, 1996.
King, SAP AG makes huge sale to Coca-Cola, Computerworld, Jul. 26, 1996.
Bane, SAP AG to support BackOffice server apps, Computerworld, Apr. 30, 1996.
SAP AG, SAP Corpotate Profile, Undated.
King, SAP overhauls training classes, Computerworld, Apr. 22, 1996.
King, SAP to showcase R/3 Release 3.0, Computerworld, Sep. 18, 1995.
Busse, SAP unveils R3 for the mainframe, Computerworld, Dec. 23, 1996.
King, SAPs R13 runs late but users give high marks, Computerworld, Jul. 31, 1995.
Vidovic, Implementing SAP R/3 on OS/400, IBM Corporation International Technical Support Organization, Rochester Mn., 4th Ed. 604 pages. Aug. 2001.
Earls, In the fast lane, this year's No. 1 premier 100 company excels with minimal 1 investment, Computerworld, Oct. 9, 1995.
Bancroft, Implementing SAP R/3, Manning Publications Co., Greenwich, CT, 1996.
Miser et al., The Microsoft Merchant Server Book, Ventana Comm. Group, Inc., Research Triangle Park, NC, 1997.
*DE Technologies, Inc. v. Dell, Inc.*, Cvil Action No. 7:04CV00628, in the United States District Court for the Western District of Virginia (Pursuant to Section 2001.06(c) of the Manual of Patent Examining Procedures concerning information from related litigation, the applicant hereby provides notice to the USPTO of the existence of this litigation involving the subject matter for which the patent is being sought. The parties to this litigation have executed a Settlement Agreement on Jul. 25, 2007.).

Memorandum Opinion and Order related to claim construction, *DE Technologies, Inc.* v. *Dell, Inc.*, Civil Action No. 7:04CV00628 (W.D. Va. Feb. 14, 2006).

Memorandum Opinion and Order related to claim construction, *DE Technologies, Inc.* v. *Dell, Inc.*, Civil Action No. 7:04CV00628 (W.D. Va. Mar. 21, 2006).

Memorandum Opinion and Order related to partial summary judgment of invalidity, *DE Technologies, Inc.* v. *Dell, Inc.*, Civil Action No. 7:04CV00628 (W.D. Va. May 10, 2006).

Memorandum Opinion and Order related to partial summary judgment or partial summary judgement of noninfringement, anticipation and inequitable conduct, *DE Technologies, Inc.* v. *Dell, Inc.*, Civil Action No. 7: 04CV00628 (W.D. Va. Apr. 9, 2007).

Dell Inc. Supplemental Responses to Interrogatories No. 14 and 20, *DE Technologies, Inc.* v. *Dell, Inc.*, Civil Action No. 7:04CV00628 (W.D. Va. Aug. 4, 2006)(relating to Dell's allegations fo anticipation and obviousness).

Jelassi, Tawfik, Competing Through EDI at Papeteries Brun Passot: Making Paper Passe, Jan. 1993 (citation only).

NatWest Bank Surges into Cyberspace, Financial Technology Information Bulletin—vol. 13, No. 11, pp. 1-12 (Jul. 1996).

Monteleone, A good SAP is hard to find, Computerworld, Mar. 6, 1995.

* cited by examiner

UNIVERSAL SHOPPING CENTER FOR INTERNATIONAL OPERATION

PRIORITY INFORMATION

This Continuing application is a continuation of U.S. patent application Ser. No. 12/322,043 filed Jan. 28, 2009 now abandoned; which is a continuation of U.S. patent application Ser. No. 10/919,763 filed Aug. 17, 2004 now abandoned; which is a continuation of U.S. patent application Ser. No. 09/606,931 filed Jun. 29, 2000 (now U.S. Pat. No. 6,845,364); which is a continuation of U.S. patent Ser. No. 08/999,297 filed Dec. 29, 1997 (now U.S. Pat. No. 6,460,020); which claims benefit of Provisional Patent Application Ser. No. 60/033,984 filed Dec. 30, 1996; all contents of the subject applications being incorporated herein by reference.

TECHNICAL FIELD

The present invention is related to electronic merchandise catalogue and ordering systems for use on the internet/intranet. In particular, the present invention is directed to the facilitation of international purchasing of goods over the internet/intranet, addressing all aspects of such transactions.

BACKGROUND ART

Consumers have already discovered the advantages of shopping from their homes by the use of catalogues, television shopping channels or by computer transaction systems. There are numerous public internet web sites and private intranet sites that offer various articles and services for sale. Most of these public web sites and private sites operate in national configurations where the buyer and seller are restricted to a particular language and currency.

There are a number of transaction systems using electronic communications, including the internet, as conduits for carrying out an exchange of goods and funds. The conventional technology includes a number of examples containing some relevant elements for international transactions for goods to be sold across national boundaries.

U.S. Pat. No. 5,319,542 to King, Jr. et al., teaches a system for ordering items using an electronic catalogue stored on a publicly accessible database. The patent includes a description of a related scheme of online catalogues provided by the Prodigy-Corp., as set out in col. 1, beginning with line 26. The use of the Prodigy system suggests the use of the internet for providing both catalogue information and as a conduit for entering electronic purchase orders to be sent to the vendors. A key aspect of the catalogue system is that both public and private catalogues can be maintained. Both can be updated electronically, presumably through the internet since other methods are not described. The catalogue system includes provisions for pre-negotiated prices and predetermined shopping lists for specific customers. A key marketing aspect of this system is the provision of competing product information since catalogue data from multiple vendors is provided for the public electronic catalogue. The authorization aspects of the requisition process appear to be limited to that carried out within a customer's own organization rather than through a third party bank or clearing house.

U.S. Pat. No. 5,420,405 to Chasek discloses a system of creating electronic or virtual money for personal transactions. The virtual money can integrate the functions of cash, checks and credit cards while the system provides constant surveillance against fraud. This virtual money is conceived as an international medium of exchange, and includes provisions for automated sales tax collections and payments. As a result, the purchase price is incremented by multipliers for city, state and federal tax within national borders. The system uses an on-person terminal permitting automated transactions of all sorts as well as record-keeping of personal accounts. This terminal system includes a known universal toll-paying system using point-of-sale debiting via radio signals. The Chasek system uses an electronic banking sub-system that can transfer funds between two individuals. The operation of the system includes the use of medium-exchange packets of bytes that identify the personal account custodian, the payer, the amount of transaction, the type of transaction, the vendor, a security number and a national code. Such a transfer uses a personal account custodian to transfer between the customer (who has transferred funds into a predetermined account) to another individual such as a vendor who then obtains access to those funds via the personal account custodian. Communications between personal account custodians and vendor account custodians are carried out using radio waves via a satellite transponder, insuring that a personal account custodian in one country can reach a vendor account custodian in another country.

U.S. Pat. No. 5,594,225 to Botvin discloses a method for conducting financial transactions via digital facsimile wherein the transaction is cleared after the draft documents faxed by the payer to the payer's bank are presented and processed via machine-readable equipment.

U.S. Pat. No. 5,666,493 to Wojcik et al. discloses a system for managing customer orders including an electronic catalogue to streamline the buying functions. The system has an order management function, integrated with financial services, to process orders and create financial records. The system also includes a logistics function for consolidating orders for optimum delivery over existing transportation systems. An inventory management system is also included and arranged to cooperate with the order management function. This functionality is achieved by accessing each subsystem data base on a real-time basis by horizontal integration of each subsystem to create an efficient data flow between the various subsystems. The selection of the details of transporting the goods is one of the subsystems that is accessed on a real time basis. Thus, customers entering orders can be provided with the shipping costs as well as other shipping details as the order is input. Likewise, credit authorization can be carried out on a real time basis as an order is entered.

U.S. Pat. No. 4,926,368 to Morita et al. discloses an electronic currency conversion apparatus. Likewise, U.S. Pat. No. 4,766,293 to Bosten discloses a transaction card capable of authorizing a transaction using various currencies. U.S. Pat. No. 5,644,721 to Chung et al. discloses a computer reservation system using a "global currency" to carry out consolidation of travel reservations throughout the world. U.S. Pat. No. 5,644,115 to Fraser discloses a system for automatically matching sellers and buyers using, among other techniques, the internet. U.S. Pat. No. 5,351,189 to Doi et al. and U.S. Pat. No. 4,383,306 to Morimoto et al. both disclose electronic language translators.

If there are international sales, realistic currency conversions become a factor, as do issues of customs, import/export duties and shipping. These are not taken into account in conventional transactions system. Also, in conventional internet or intranet transaction systems the translations of all foreign catalogues, including the full terms of sale and shipping costs, are not always provided. As a result the buyer of goods from a foreign country often faces large, unexpected charges upon delivery of the goods. Such systems are clearly not suitable for a global market place or the requirements of doing business internationally.

SUMMARY OF THE INVENTION

Therefore, it is one object of the present invention to consolidate all the disparate components of an international sale into one program whereby a buyer can go shopping by computer almost anywhere in the world.

It is another object of the present invention to provide a transaction system whereby a buyer can go shopping by computer almost anywhere in the world using the buyer's own language.

It is a further object of the present invention to provide a transaction system whereby a buyer can go shopping by computer almost anywhere in the world and see a display of goods priced in the buyers own currency.

It is yet another object of the present invention to provide a transaction system whereby a buyer can go shopping by computer almost anywhere in the world and be provided with full shipping charges for the delivery of selected goods so that the shipping costs are paid as part of the overall price of the goods selected.

It is still an additional object of the present invention to provide a transaction program whereby a buyer can go shopping by computer almost anywhere in the world so that goods selected for purchase are priced to include any import duties or other such taxes accruing to the purchaser thereby allowing the purchaser to pay these funds as part of the cost of the goods selected at the time of the purchase.

It is yet a further object of the present invention to provide a transaction system whereby a purchaser can go shopping by computer almost anywhere in the world and purchase goods using an approved credit cards, conventional system, or other electronic currencies.

It is still another object of the present invention to provide a transaction system whereby a buyer can go shopping by computer almost anywhere in the world so that the buyer is able to compare products from different countries on a global scale.

Yet another object of the present invention is to provide a transaction system whereby a buyer can go shopping by computer almost anywhere in the world to facilitate direct consumer sales or business to business sales.

Yet an additional object of the present invention is to provide a forum whereby manufactures can expand into new export markets by way of a transaction system that allows a buyer to shop by computer virtually anywhere in the world, thereby lowering distribution costs to the manufacturers, and as a result, consumer costs.

These and other objects of the present invention are achieved by a system for carrying out an international transaction over EMF conventional links carried out over the internet using computer to computer communications. The process is initiated by accessing an internet web site or private site controlled by the international transaction program. The customer accessing the web site then selects a language in which to view catalogue information. The customer also selects the currency in which to pay for the products to be bought. After selecting products for consideration the customer can trigger calculation of all charges involved in an international transaction for purchasing the selected product by selecting of a shipping destination. If the customer chooses, he can initiate the order for the selected product including automatic credit authorization, and the generation of an electronic title.

BRIEF DESCRIPTION OF THE DRAWINGS

FIG. 1 is a flow chart depicting the operation of the transaction system of the present invention.

DETAILED DESCRIPTION OF THE PREFERRED EMBODIMENTS

The design of the international shopping and transaction system of the present invention creates a seamless order entry system for shopping on the World Wide Web or private networks. A plurality of computer databases and systems are accessed to complete the functions necessary for both national and international transactions for the purchase of goods and services. All of the interactions between the various external databases and the transaction program are controlled by transaction program. The transaction system contains or interacts with various databases, including:

1) product and catalogue information, including translations into different languages of product catalogues;
2) currency information, including conversion data and alarm data indicating instability;
3) product codes from harmonized tariff tables, including tax and import information, including administrative requirements and data for satisfying such requirements as well as foreign duty information, including methods of calculating all duties, luxury taxes, etc.;
4) vendor inventory and order entry database;
5) shipping information, including all options for each leg of a journey between product origination and customer destination;
6) credit authorization and/or funds transfer confirmation database and processing system; and,
7) customer information, including credit and financial data, as well as purchasing records and profiles.

These databases interact in the manner shown in the flowchart of FIG. 1 and as described below to provide all of the necessary information to complete a transaction. Communications between the transaction program, the customer and the various databases can be carried out using any of electromagnetic force (EMF) wave communications link such as radio waves, light pulses, telephone lines, etc. The system integrates all of the aforementioned databases, (depicted as databases 1-7 in FIG. 1), including databases owned by the system operator controlling the transaction system of the present invention, as well as external databases (such as credit authorization database 6).

The initial entry into the system provides an opportunity to determine the speaking language of the customer. The selection of language operates a default to select the most likely currency of the customer unless the customer indicates otherwise. The system is set up so any or all countries of customers can be linked to any language and prices converted to any currency. However, in practical terms some products will not be available in all countries nor appropriate for all countries. Once the language has been determined and the currency has been selected, the customer is then able to review product listings that have prices that reflect the currency and taxes of the country in which the customer resides.

Figure 1A:
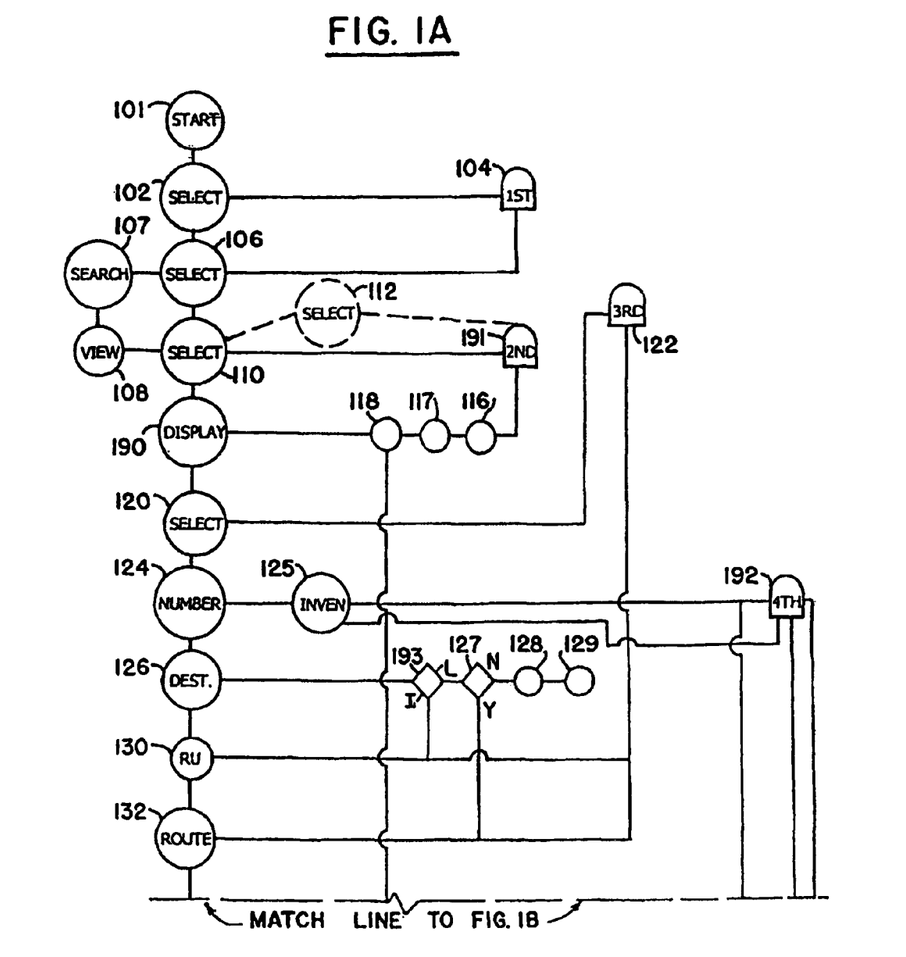
Figure 1B:
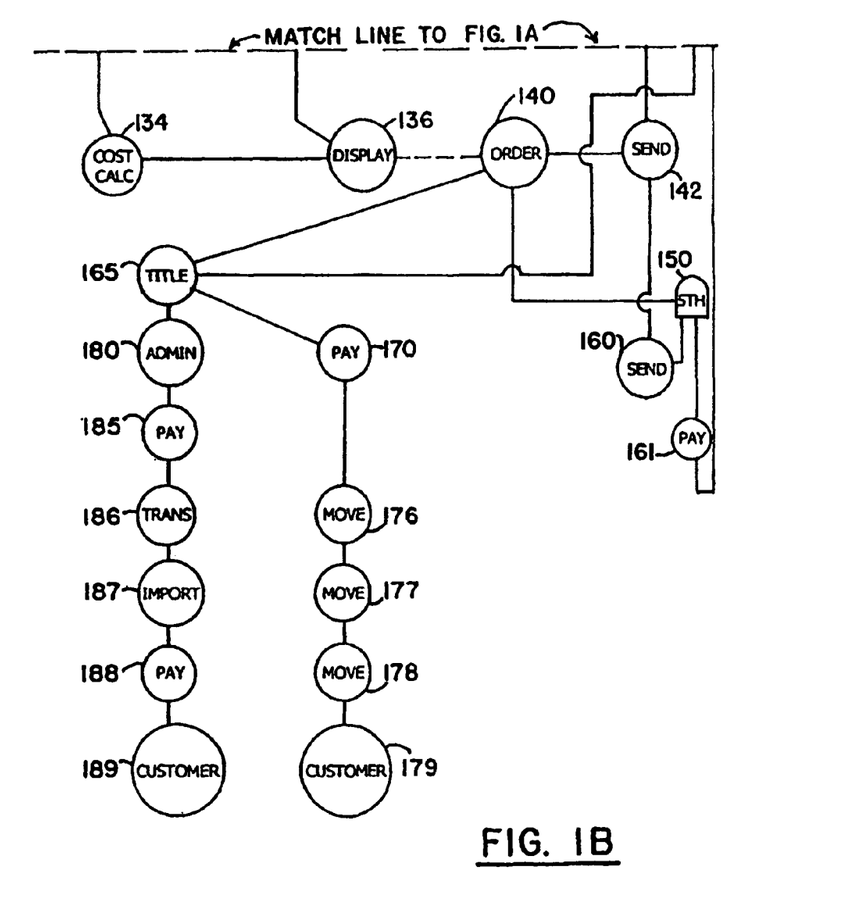

The precise operation of the inventive international transaction system is depicted in the flow diagram of FIG. 1, which is suitable for national as well as international transactions. At step 101, a user accesses the internet web site upon which the customer portion of the transaction is carried out. A menu is provided to the user or customer permitting selection from among a plurality of different catalogues in a manner already well known in the conventional art. However, the present transaction system differs from the conventional systems in that the user is able to select a preferred language at step 102.

A plurality of catalogues, each translated into a plurality of different languages are available on the system. A particular catalogue or set of catalogues, in a preferred language, are accessed and processing center (step 104) from the first database and downloaded for access by the user. Preferably, the language translation databases containing the translations of all of the catalogue material are held in separate databases on computers separate from those handling the interface with the customers. This arrangement will save time and memory space for the computers actually handling the transaction. The first database can be managed by the system operator of the inventive transaction system or can be external to the transaction system. In the latter case, the system operator can access such data over the internet, intranet or any other electromagnetic force (EMF) wave communications link.

Preferably, the user is provided with a plurality of different catalogues from among which to select on a real time basis. It is expected that many of the catalogues will be from sources outside of the United States, as well as the English-speaking world. Consequently, there must be pre-translated versions of catalogues in non-English languages, thereby allowing real time access of each of the catalogues in a plurality of different languages.

This is handled by the first database and processing center (depicted as $1^{st}$ database in FIG. 1) which serves as a catalogue builder. At step 105 a desired catalogue (and its country of origin) is selected and the country of the customer is input to select a default currency, which is used as a trigger to guide the operation or portions of the transaction process once a product or products are selected from the electronic catalogues. The downloading of the country of origin of the selected catalogue also triggers an automatic access of the translation database ($2^{nd}$ database and processing center in FIG. 1) to provide the specific currency conversion between that of the original catalogue country and that of the customer as selected by the automatic defaults. However, the customer has additional currency conversion options as described with respect to the 112 supra.

Since a plurality of catalogues is contemplated, a "power search" for a specific product (or service) from among all of the catalogues is available to the customer in order to decrease the search time for the desired products. If an optional "power search" is requested at step 107, automatic access of the language translation database occurs to search the selected language versions of each of the catalogues contained therein. Once this has been done, a list of catalogues is provided to the customer in menu form so that the customer may view any or all of the catalogues.

At step 108 the customer selects and views a particular catalogue and product within that catalogue for consideration. The product is presented in menu form so that the variations and permutations, and other characteristics of the product can be studied. This is done in menu form in a manner well known in the conventional art directed to electronic catalogues. In the alternative, a catalogue from a particular vendor can be selected instead of going through the "power search" for the entire catalogue inventory. Further, the "power search" engine can be activated once more to find a particular product in the selected catalogue. In the alternative, a printed index (such as those used in hard copy catalogues) can be provided.

Making a selection from the catalogue produces linked web pages for any of the products listed. The power search function from the product page allows the customer to search for key words for one or all of the catalogues listed. In each catalogue a manufacture's index allows a look at products from a single manufacturer. The customer can also go backward or forwards through the program at any time. A picture (or several pictures) of the product are normally accompanied by a description of the product, name of the manufacturer, shipping weight, cost (in the customer's currency), and other information about ordering options (available sizes, colors, styles, etc.) and the means to select multiple units of the product (with the desired options).

When a particular product is selected in the customer's currency, a price in the customer's currency is automatically requested. Normally currency is chosen by default (step 105). However, the customer has the option of selecting a particular currency (step 112) in which he wants the catalogue price of the selected products. The currency conversion is carried out at the second database and processing center. This second database provides a "real time" conversion from the currency of the country in which the catalogue originates to that selected by the customer. The price is provided to the customer with a clear indication that this is the price for delivery at the vendor's factory or at one of the vendor's distributors, not the customer's location.

However, there are difficulties with "real time" currency conversion. For example, because the currency trading is carried out electronically, there may be an almost constant change in the conversion rate. Consequently, it is necessary to freeze the conversion rate for purposes of carrying out a selected transaction at a particular point in time. This can be done automatically (step 116) at the time that the customer initially asks for the converted catalogue price by selecting a particular product. In order to compensate for any disparity between the quoted exchange rate and the real exchange rate when the transaction between the customer and vendor takes place (either independently or through the auspices of the present transaction system), the transaction system adds a small percentage to the conversion rate (step 117). This percentage can also accommodate any charges to the vendor or customer for using the transaction system and taking advantages of the conveniences inherent thereto.

At step 118, an automatic alarm is activated when one or both of the currencies in the selected conversion process are exhibiting wide fluctuations in value. Such fluctuations can be determined by the system operator so that when in the operator's opinion, currencies become unstable, transactions in one or both of the subject currencies can be suspended by the system. Such suspension can be automatic or manual, depending upon the preferences of the system operator. When the decision is made, a message is sent to the customer instead of a price, indicating that because of instability in the currency market, transactions in a particular currency have been suspended. At which time, the customer can be offered the option of an alternative currency, if such an alternative is feasible. For another option, the customer can be offered a higher price to compensate for wide swings in currency conversion values. Any or all of these opinions are presented to the customer, along with any other desired catalogue information, at step 119.

Should the currency conversion be stable, the price is displayed to the customer almost instantaneously after either step 105 or optional step 112. Also displayed with the price is a message indicating that the price displayed is limited to the vendor's factory, or one of his outlets, however the vendor may choose. The message will also indicate that the customer must request additional information to obtain the price for the product to be delivered to a destination of the customer's choosing. It is crucial that the message clearly indicate to the customer that there is far more expense involved to obtaining the goods than merely the original price at the factory or the distributor of the vendor. This is especially true if the vendor and customer are in different countries, such as the United States and the Netherlands (see Appendix I).

Thus, the customer is given the option of determining the real price of the transaction. If the customer makes this request (step 120), the next stage of the inventive process is carried out. Responsive to an affirmative answer by the customer, a commodity code of the selected product is obtained (step 122) by accessing the third database and processing center, containing look-up tables of the harmonized international tariff tables and classification system, as well as the formats for any necessary import/export data, and administrative requirements for all countries involved in possible transactions. If the vendor's country of origin or the destination country has commodity codes different from those of the harmonized tables, a search is conducted in other databases by the third database and processing center to determine the correct commodity code. This will be used to look up other data related to the product and the country of destination, as well as generate appropriate documents from the third database. The commodity code can be displayed to the customer for his or her information. However, this is not necessary. Rather, the commodity code in conjunction with the country of destination is used to trigger certain subsequent operations of the inventive transaction process as depicted in FIG. 1.

The "real price" or the price to deliver selected products to a specified point (presumably one convenient to the customer) entails the cost of all freight for each leg of the journey, insurance (if desirable), sales taxes, handling charges, document generation and forwarding charges, import/export duties, and "value added" taxes as well as luxury taxes (if applicable). The first step in calculating the cost of freight is to find out the total number of items to be shipped. This is input by the customer at step 124 at the point a determination is made between retail and wholesale transactions based on product type and amount, and customer identity. This determination can trigger the selection of shipping conditions at step 128 Supra. This operation will trigger an operation (step 125) of checking with the vendor that the indicated number of the selected products is available. This is done by accessing a fourth database and processing center (preferably generated and maintained by the selected vendor), automatically contacting the vendor and requesting confirmation of the inventory. Should the requested number of products be unavailable, a message can be sent back to the transaction program to be displayed to the customer. Also, any additional information regarding product availability, such as expected delivery dates etc., can be provided at this time.

At step 126, the customer inputs the destination for purposes of calculating the cost of delivering the selected product or products to that destination. This information, in conjunction with the commodity code triggers the particular calculations for packaging, shipping, taxes, duties, insurance etc. of the rest of the transaction process. This is necessary to select the correct freight routes and charge. If, for example, the destination point is within the vendor's country of origin (a determination made at step 126), the calculation of transport charges and duties is much simplified. Calculation of standard freight charges is provided, along with the optional insurance and any other charges, to the customer at step 127.

This information can be displayed on the screen as soon as the customer indicates the destination point due to the simplicity of the calculations.

The options that can be displayed at step 127 allow the customer to choose the various transport and insurance options that are available (depending on retail/wholesale status). Also, the vendor may offer a standard transportation package to customers that may be less expensive (because of vendor volume and leverage with carriers) than the options that would be available to individual customers. Where appropriate, customer selection of the options can be made at step 128 (if permitted by the vendor in a national transaction). A simplified operation of the inventive process would occur if a national transaction and no customer transport options were involved. As a result only sales tax would be added to the freight charges. Once the decisions at step 128 are made, the sales tax can be computed automatically and displayed to the customer at step 129. For most domestic transactions within the United States, the process would end at this point unless the customer chose to enter the order and begin that part of the process dealing with credit confirmation and the transfer of electronic title and the shipping of the selected goods.

For international transactions (to which the present invention is specifically directed) and situations in which a customer can select some freight options, the calculation of freight charges is more complex. First, (at step 130), revenue units are calculated for the products to be shipped in four different ways, including: metric units for air transport; metric units for sea transport; standard English units for air transports; and, standard English units for sea transport. The precise calculations of each type of revenue unit are found is Appendix II. These calculations are standard in the shipping industry, and based upon information derived from the third data base, including packing requirements based upon the characteristics of the selected product or products. The type of revenue unit selected by a vendor, customer or the instant transaction program depends upon a variety of factors, including: the country of origin of the vendor; the country of origin of the shipper; the type of product involved (commodity code); and, (most important) the least expensive method of transporting the goods at issue.

At step 132 a determination of the discrete legs or links of the overall transport route are determined based upon shipping data contained in the fifth data base and processing center. This is also done based upon a standard shipping route dictated by the vendor, the route requested by the customer, or some combination of the two. The transport route is further based on type of product indicated or the commodity code provided by the third data base, which also provides the shipping administrative requirements of a specific product. In many cases, the various discrete legs of the route are dictated by the nature of the product being shipped. For example, an automobile being shipped from Germany to the United States will be transported by sea, and embarked on a ship at the port in Germany most convenient to the automobile manufacturer. The manufacturer will most likely dictate that the sea transport take place from the German port of his choice to New York city. At which point, the customer has options of how the car will be taken from the wharf, through U.S. Customs, and to the final destination. Thus, between the vendor and the customer each discrete leg of the transport route is determined (step 132), as well as the costs accompanying each of those discrete legs of the journey (step 134).

An example of such expenses are found in Appendix I which depicts the costs for each discrete leg of the journey, and how such costs are added to the factory price of the goods of issue. Each discrete leg of the route includes costs such as insurance, taxes, licensing fees, handling fees, and documentation fees. Thus, based upon the origin of the goods and the destination, as well as the revenue units for the package of the goods and the classification of the goods themselves, the cost of each discrete link is calculated in a manner similar to the example found in Appendix I. The calculations take place in a number of sub-steps as indicated in Appendix I.

Of course, the sub-steps are determined by the origin and destination. At step 134, all costs such as freight, handling, basic taxes (such as sales tax) and documentation fees, insurance, import/export charges, etc. are calculated to provide a total cost to obtain the selected product or products at the selected destination. In many places import/export fees are based not upon a factory price of the goods but upon a first preliminary sum, including all necessary expenses to move the product or goods to the point at which the duties are assessed. These duties are added to create a second preliminary sum because under some conditions, additional taxes such as luxury taxes, value added taxes, etc. are based upon the second preliminary sum which includes transport expenses, some sales taxes and some import/export duties. So the final sum displayed at step 136 includes all of the taxes under all of the circumstances is based upon applying coefficients (based upon tax rates) to the previous two sums. The example of Appendix I indicates the values that are involved, and how some of the taxes in the destination country are calculated based upon previously calculated product cost, freight costs, insurance, taxes, etc.

The results of this calculation are converted (at step 136) to the country requested by the customer in the same manner as described with respect to steps 112, 116, 117 and 118. Thus, a potential customer has the full cost of a foreign transaction displayed in front of him before the transaction is actually carried out. This is in contrast to other electronic or internet transaction systems, which do not address the international transactions or any but the simplest tax and shipping charges.

At this point the customer has the option to investigate the prices of other products or of entering the order for the products selected. To order the products (step 140) the customer activates the appropriate area on the menu screen. This activation triggers two processes. In the first process an order is sent directed to the vendor electronically (step 142) requesting shipment to the customer's destination. While this is the preferred method, the order can be buffered electronically by recording devices, or handled by human operators, or any combination of the three to access the order entry operation of the fourth data base and processing center, preferably maintained by the vendor. The vendor can then process the order for the selected products deduct from inventory and arrange for shipping to the requested destination.

In order for the vendor to ship the selected products, it will be necessary to access a source of funds from the customer. Consequently, it is necessary that the electronic order also initiate a second process, confirmation of customer credit (step 150). This can be done by accessing a sixth data base and processing center, preferably a credit or funds transfer system. Preferably, this operation will be carried out using a credit card processing center to receive and encode the credit card number using a commercial security system such as PGP (Pretty Good Protection) to confirm the validity of the credit card. The same processing center can then send a confirmation for the respective customer order to the vendor (step 160) by accessing the vendor order entry system (fourth database). Transmission of credit data between customer, vendor and standard credit card system carried out by the instant transaction system.

However, standard credit card authorization is not necessary for the inventive system to function. A conventional authorization can be carried out using two commercial banks, one representing the vendor and the other the customer. This is the manner in which funds are usually transferred between two countries having different currencies. However, such transfers are often awkward and time consuming requiring exchange of papers and the approval of bank officers. Thus, the conventional exchange of funds between foreign banks could greatly hinder the operation of the inventive system even if carried out electronically by the present transaction system. Consequently, the use of international credit cards, such as American Express, is generally favored to expedite the operation of the present invention. However, even international credit cards can sometimes hinder the operation of the present invention due to limitations on the banks issuing the credit cards.

Consequently, another preferred method of authorizing credit includes the establishment of a system of clearing houses operating parallel to that of commercial banks and credit cards organizations. Each vendor participating with the transaction system provider operating the present invention would make arrangements to accept credit verifications from local clearing houses established by the system operator in each country where the vendors are located. The clearing houses in different countries would be in direct electronic communication with each other over the internet, satellite links, intranet, dedicated data lines or any EMF communications links, providing data transfer secured by commercial encrypting packages, such as PGP or SET. The clearing houses in each country could accept local credit cards in the same manner as any local vendor. Thus, a customer's local credit card could provide access to funds to a local clearing house like any vendor obtaining funds via credit card, which could transfer credit for the customer to a clearing house overseas without the necessity of passing through the complicated international banking procedures. A foreign vendor whose products are about to be purchased by the customer could be paid through an electronic clearing house that has received clearance for the clearing house in the customer's country. The clearing house in the vendor's country would act like a local credit card company, transferring funds to the vendor on behalf of the customer. Preferably, the entire transaction would take place electronically in the same manner that most credit card transactions are handled conventionally. Thus, funds available to a customer from local bank credit in the Netherlands could be translated into funds available to American factory which will send the car to a Virginia port for export (see Appendix I).

Once electronic funds (or other authorization) are transferred to the vendor (step 161) from a local clearing house, the vendor will utilize a connection to the transaction system of the present invention to generate an electronic title (step 165) also referred to as a commercial invoice. Paper copies of the title or commercial invoice can also be generated from the electronic original for archival purposes or for presentation to entities requiring hard copies to further process the title or commercial invoice. Generation of the electronic title (at step 165) is done to create a faster transfer of title through all the official channels that must approve of the title and from there to the customer. The electronic title can be generated by the vendor or the instant transaction system upon authorization by the vendor. Conventionally the hard copy of the commercial invoice accompanies the goods and must be hand-carried to all of the official entities (such as national the customs service) that must process the papers, check the goods and authorize movement in and out of a particular country. Also, the conventional handling of the commercial invoices results in extra fees to the customer, but cannot be avoided since it must take place at every discrete leg of the shipping route. Further, the loss of these papers can be catastrophic in terms of receiving the goods in a timely fashion.

Upon generating the electronic commercial invoice (step 165 based upon vendor authorization or provided by the vendor), the vendor must carry out two types of activities. The first is administrative, and includes satisfying the requirements of the various governmental and regulatory entities controlling commerce and manufacturer at the location of the vendor (step 180). The second is to arrange transportation to the point requested by the customer (step 170). Under the simplest condition, this means paying the sales tax and a carrier to ship the goods at least part of the way to the customer's requested destination.

However, when international transactions are involved, such as depicted in Appendix I, a great deal more administrative work is necessary. Further, there are also added complications and expenses in the actual packing, handling and shipping processes. In such a situation, the vendor must arrange and pay for transport from the factory to a shipping port (step 170), as well as all handling charges, wharf fees, packing fees and the insurance that is always necessary when sending valuable goods by ship. A similar process takes place when goods are sent by air although there are fewer complications in terms of moving the goods from a terminal (usually where the national customs and export authorities must approve the goods) onto a plane. Of course, to move anything onto an international carrier such as a ship or a plane, the commercial invoice, packing list and any governmental release papers are needed, indicating that goods have been cleared for export. In the alternative the present transaction system can make the shipping arrangements on behalf of the vendor.

Along with the physical packing, handling and shipping of the goods, it is necessary to carry out the administrative functions. The present inventive system handles these (step 185) by sending electronic requests to the necessary governmental agencies based upon the commodity code from the harmonized and the country of destination. This combination will trigger a series of operations (out of a large number of possible operations) to satisfy the administrative requirements for carrying out the transaction, including the generation of all necessary documents based on data from the third database.

For example, the combination of destination and commodity code may automatically trigger a request to the Department of Commerce (DOC) for an export license. This can be done electronically since the DOC, like most governmental entities, is capable of receiving communications via e-mail and responding thereto. The electronic title can be sent as part of the request for the export license, and the response from the state department returned electronically. The electronic documentation from the DOC can then be used to make a request to the State Department to obtain clearance to export the subject goods, if the commodity code and destination country justify that such a request be made. The electronic indication of an export license from the Department of Commerce and the electronic clearance document from the State Department can be sent electronically to the U.S. Customs service along with the electronic title to obtain prompt clearance that will allow the goods to be transferred quickly from the local carrier to an international carrier such as a plane or ship.

As step 170, the vendor has the option of paying the local taxes, local transport costs, insurance, packaging, etc. himself, or contracting to have some of this done though the inventive transaction system. For example, the transaction system provider can arrange to pay local taxes, arrange for the local transport and insurance. However, because most vendors currently have systems in place to efficiently handle such tasks, it is unlikely that the duties will fall to the operator of the transaction system.

On the other hand, the payment of export duties, export license fees and handling through customs are tasks far more suited to the present transactions system since it is normal to have the customer pay for these requirements, and the system operator has direct access to funds provided on behalf of the customer, either through a credit card company or the system operators own electronic clearing houses. The electronic documents can easily be converted into hard copies if signatures are necessary and the signature converted back to electronic documents. With the increasing acceptance of government entities in general to accept electronic signatures (such as that provided by a facsimile machine), it is feasible that electronic signatures can be attached to the modified electronic documents by a number of ways already well-known in the conventional technology. Approvals from various government entities and the customs service can be added to the document electronically either by machine or by scanning the written signature and stamps of an authorizing official.

When dealing with international carriers such as ships or airplanes, goods to be transported are normally moved with the commercial invoice attached thereto. The goods are placed into the keeping of an official of the international carrier (step 176), such as a ship's captain, and the captain also takes possession of the commercial invoice (step 186). Normally, a bill of lading and export packing list are attached to the goods and a copy kept with the commercial invoice. In conventional transactions, when reaching the destination port, the international carrier official (such as the ship's captain) will turn over the commercial invoices to a commercial entity which specializes in moving the paper from the carrier to the customs department of the destination country. This also adds expense to international transactions. However, with the present transaction system, the electronic titles and export packing list for the goods can be transferred directly from the international carrier official by system operator to the national customs departments of the destination country at the port receiving the goods at issue (step 187). Normally, this is done by carriers such as FedEx, UPS, etc., and is often done in conjunction with moving the goods off the wharf/ramp/tarmac to the national customs area (step 177). Rather than providing a hard copy of a commercial invoice, an electronic copy with the authorization of the international carrier can be provided either as an electronic document or a hard copy can be generated and provided with signature of an official of the international carrier. Preferably, the electronic documentation will be presented to the customs officials along with payment of the precalculated taxes, import duties, value added taxes, luxury taxes, etc (step 188). Transfer of funds can be made electronically to the national customs service or other governmental services if this is permitted. Otherwise, the transaction system of the present invention can arrange for the funds to be provided to the international carrier or some other agent for presentation to the customs officials when the commercial title, bill of lading, etc. are presented so that the goods can clear national customs.

Once the goods have been moved out of the customs area, a local carrier can take possession (step 178) and begin delivery to the requested customer destination (step 179). The present system is capable of arranging payments with local carriers so that the customer does not have to go through this process. It is expected that this arrangement will be more convenient since the translation system operator will probably have better arrangements with local carriers than can be obtained by individual customers. The system operator will also have direct access to customer funds to ensure that payment to the local freight carriers is made.

Once the commercial invoice clears the customs service, the document can be sent electronically via the internet, intranet, facsimile, PTP, or any other convenient means, directed to the customer (step 189). The electronic title, modified in accordance with the customs regulations of the two respective countries and the international carrier, will provide a complete memorialization of transfer of the goods from the factory to the final destination point. Based upon the dates added to the electronic title, the customer will know exactly where his goods were during the time taken to traverse the route from the factory to the final destination. Thus, the customer will have a complete record for monitoring costs and determining the point at which possible damage occurred.

Once an order is entered (step 140) the customer information is loaded into the customer database and inventory information updated. The customer information can be used to create customer profiles to be stored in the $7^{th}$ database and processing center. Such information can later be used to guide customers to catalogues or products related to previous purchases, as well as previously selected languages and currencies.

The present invention provides a comprehensive point-to-point cost analysis for any international transaction, as well as transactions conducted within a single country. All costs are disclosed to the customer before the order is actually entered. The transaction system also provides automatic fund transfers via credit card systems or virtual currency in clearing houses to carry out the transaction, paying any necessary governmental agencies electronically. By conducting electronic transactions, the necessity of forwarding paperwork in international transactions is often eliminated, and the overall costs reduced. Further, by providing an electronic title as the commercial invoice, the documentation flow is facilitated, costs reduced and the customer receives proof of purchase in a more timely fashion. As a result, international transactions can be carried out without unexpected charges being assessed against the customer upon delivery of the goods.

Although a number of embodiments of the present invention have been disclosed by way of example, the present invention is not to be limited thereby. Rather, the present invention should be interpreted as including all variations, permutations, adaptations, configurations that would occur to one skilled in this art who has been taught the present invention as construed only by the following claims.

We claim:

1. A process for facilitating passage of selected goods through at least one authorization point using a computer transaction system, said process comprising the steps of:
   a) receiving an identification of the selected goods, by said computer transaction system;
   b) configuring a transaction for sale, by said computer transaction system, of said selected goods including arranging transport along a predetermined transport route;
   c) initiating movement of said selected goods, by said computer transaction system, along said predetermined transport route;
   d) generating an electronic document, by said computer transaction system, designating ownership of said selected goods for said at least one authorization point along said predetermined transport route;
   e) transmitting the electronic document to said at least one authorization point; and,
   f) permitting modification of said electronic documents at said at least one authorization point.

2. The process of claim 1, further comprising the steps of:
   g) modifying said electronic document indicative of movement and payment status of said selected goods along said predetermined transport route.

3. The Process of claim 2, wherein said transaction includes international transport of said selected goods.

4. The process of claim 3, wherein step b) of configuring said transaction includes at least one interactive selection between a requesting party and a supplier of said selected goods, to determine price of said selected goods, and to specify said predetermined transport route.

5. The process of claim 4, wherein said electronic document is accessed to facilitate document modification for all authorization points along said predetermined transport route.

6. The process of claim 5, wherein at least one of said authorization points require payment of duties, and said electronic document identifies parties responsible for payment of said duties at said at least one authorization point.

7. The process of claim 6, wherein step b) of configuring said transaction includes designating at least one entity as being responsible for transport of said selected goods.

8. The process of claim 7, wherein the substep of determining price includes a summation of at least a cost of said selected goods, a cost of transport, and cost of duties to be paid along said predetermined transport route.

9. The method of claim 8, wherein step c) of initiating movement of said selected goods comprises the substep of confirming payment capability from a party requesting said selected goods.

10. A method of claim 9, wherein step b) of configuring said transaction comprises at least one of a plurality of data bases containing goods catalogs of goods available, transaction languages, available transaction currencies, international classification codes, and transport providers.

11. The method of claim 1, wherein said electronic document serves as at least one of the following: an electronic title, an electronic bill of lading, an electronic receipt for payment of customs/duties, and electronic receipt confirming of passage of said selected goods through international authorization points.

12. The process of claim 11, wherein said electronic document is accessible by at least one party to said transaction in order to trace movement of said selected goods along said predetermined transport route.

13. The process of claim 11, wherein said electronic document is modified by a third party at said at least one authorization point along said predetermined transport route.

14. The process of claim 1, wherein said electronic document operates as a substitute for commercial documentation associated with said transaction and accompanying movement of said selected goods.

15. The process of claim 14, wherein said electronic document constitutes a permanent record of said transaction and movement of said selected goods.

* * * * *